United States Patent [19]

Flanders

[11] 3,981,409
[45] Sept. 21, 1976

[54] COLLAPSIBLE REUSABLE BARREL FOR FLUIDS

[76] Inventor: Robert D. Flanders, Rte. 2, Box 666, No. 42, Wilsonville, Oreg. 97070

[22] Filed: Sept. 19, 1975

[21] Appl. No.: 614,863

Related U.S. Application Data

[63] Continuation of Ser. No. 255,597, May 22, 1972, Pat. No. 3,940,008.

[52] U.S. Cl. ............................ 220/5 R; 220/DIG.1; 285/406; 220/324
[51] Int. Cl.² ..................... B65D 7/02; B65D 45/16; F16L 23/00
[58] Field of Search ............. 220/5 R, 4 B, 4 E, 75, 220/DIG. 1, 319, 326, 324; 285/364, 366, 367, 406; 292/256.65, 256.67, 256.69

[56] References Cited
UNITED STATES PATENTS

| | | | |
|---|---|---|---|
| 295,295 | 3/1884 | Sinclair | 220/23.83 |
| 3,165,341 | 1/1965 | Burns et al. | 285/406 |
| 3,940,008 | 2/1976 | Flanders | 220/5 R |

*Primary Examiner*—William Price
*Assistant Examiner*—Steven M. Pollard
*Attorney, Agent, or Firm*—Chernoff & Vilhauer

[57] ABSTRACT

A reusable barrel for storing and shipping fluids and other materials. The barrel is capable of being disassembled after initial use to minimize the space required for transporting it back to the original shipper and also to minimize the expense of reconditioning the barrel for reuse. The barrel comprises two nestable, frustrum-shaped half sections, each having a larger open end and a smaller end which is sealingly closed. The respective open ends of the two barrel halves each have respective outwardly projecting flanges formed around their peripheries and are sealingly clamped together by placing a resilient gasket between the two flanges, pressing the half sections together utilizing a hydraulic or similarly powerful machine, placing a plurality of interlocking C-shaped clamps over the flanges around the periphery of the barrel and releasing the half sections, thereby forming a fully assembled container having a tight, leak-proof and tamper-resistant seal. When the barrel is empty it may be disassembled by detaching the two barrel halves from one another and nesting one inside the other for shipment back to the producer. In their disassembled condition the barrel halves can be easily cleaned and reconditioned because of the accessibility of their interior surfaces, after which they may be reassembled and reused.

1 Claim, 8 Drawing Figures

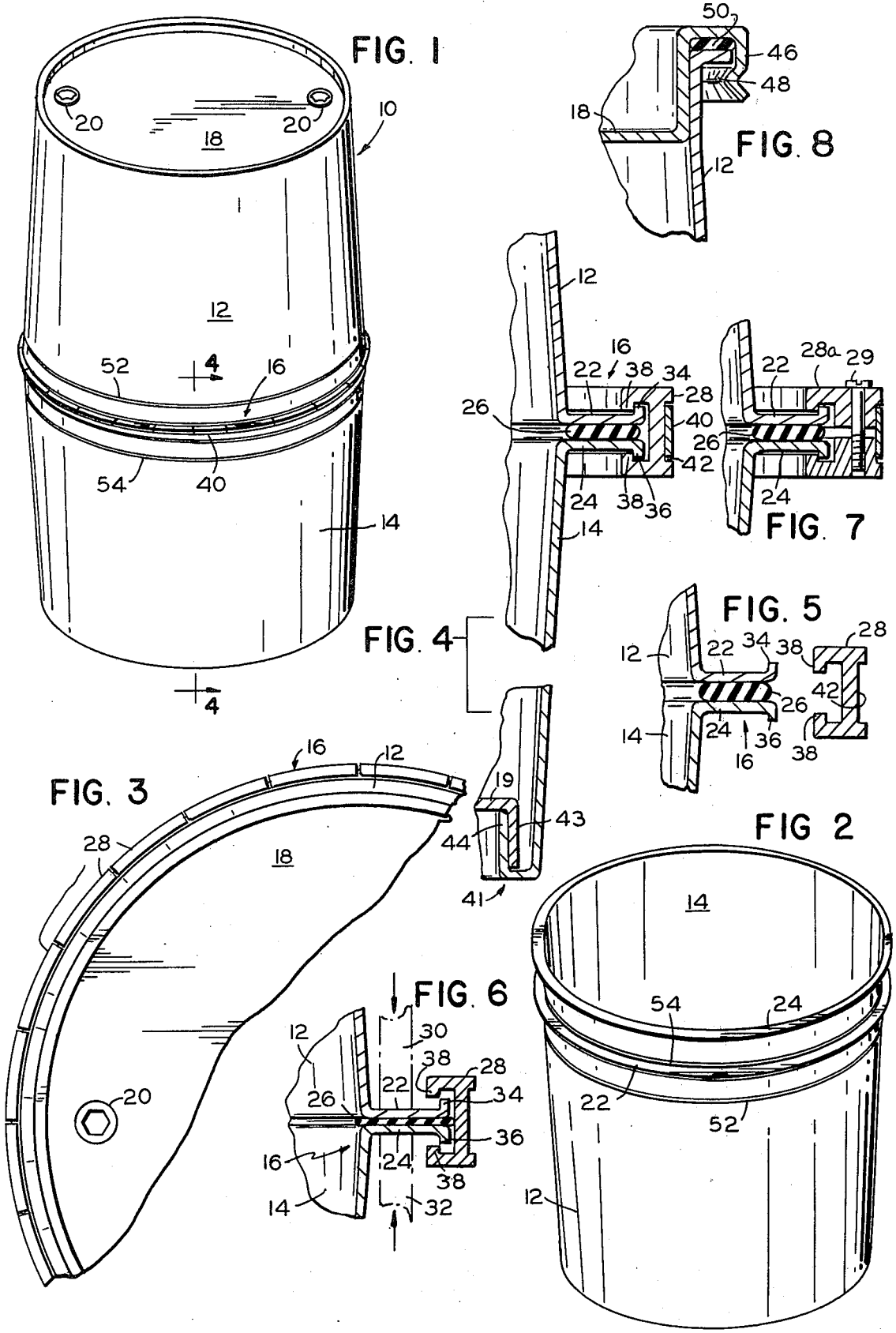

COLLAPSIBLE REUSABLE BARREL FOR FLUIDS

CROSS-REFERENCE TO RELATED APPLICATION

This is a continuation of copending application Serial No. 255,597, filed May 22, 1972 now U.S. Pat. No. 3,940,008, for COLLAPSIBLE REUSABLE BARREL FOR FLUIDS, the disclosure of which is herein incorporated by reference in its entirety.

BACKGROUND OF THE INVENTION

This invention is directed to improvements in rigid barrels generally used for the shipment and storage of a great variety of commercial and industrial materials such as fuels, lubricants and solvents, and particularly to sealing assemblies and methods of joining two detachable half sections of such barrels, wherein each such half section is in the shape of a frustrum having its larger end open and its smaller end closed.

In the shipping industry the recycling of metal barrels of the type commonly used for shipping and storing materials is limited by the costs of returning empty barrels to a supplier and reconditioning used barrels for reuse. Since conventional barrels cannot be disassembled, collapsed or otherwise reduced in size, an empty barrel occupies the same volume as a full one, thus the cost of shipping such a barrel back to its source for recycling is prohibitive. Also, such metal barrels must be cleaned, derusted, degreased and repainted before they can be used again, and because of the inaccessibility of the interior of such a conventional barrel which may only be reached through a bung hole in the barrel head, this reconditioning is a costly and time consuming process. Since the aforementioned expenses are nearly as great as the cost of a new barrel there is little economic incentive for users of such barrels to recycle old barrels to conserve valuable materials.

A solution to the aforementioned problems of recycling old barrels is provided by collapsible barrels comprising a pair of detachable half sections, each in the shape of a frustrum having its larger end open and its smaller end closed, and a sealing assembly for joining the two larger, open ends of the two half sections tightly together, as is shown for example in the aforementioned U.S. patent application Ser. No. 255,597 for COLLAPSIBLE REUSABLE BARREL FOR FLUIDS, herein incorporated by reference. Such collapsible barrels may be broken down and nested to save space for shipment, and to permit ease of access to their interiors for reconditioning.

A somewhat similar package is shown in Herrington U.S. Pat. No. 1,390,784 which discloses the use of two frustrum-shaped half sections, each having its smaller end closed and its larger end open with an outwardly projecting flange formed around its larger end. In Herrington the larger, open ends are joined together to form an assembled package by bolting the respective flanges of the two half sections together, which requires a great deal of time and limits the location of the sealed fasteners to specific points around the periphery of the package thereby concentrating the force restraining the two half sections from separating at certain points around the periphery of the package which increases the likelihood of breakage at those points and the likelihood of poor sealing at the points where the force is not so concentrated.

Sinclair U.S. Pat. No. 295,295 also shows a somewhat similar butter package which utilizes two half sections each of which is closed at one end and open at the other, and which are joined together at their open ends. The sealing assembly of Sinclair includes a pair of outwardly projecting flanges formed around the respective open ends of its half sections wherein the flanges have respective corresponding thick and thin portions, and a pair of C-shaped buttons which are placed over the thin portions and moved along the flanges peripherally around the package over the thick portions to seal the half sections together.

While the Sinclair package may be sealed more rapidly than the aforementioned Herrington package, the C-shaped buttons must be finally placed over the flanges at specific points around the periphery of the package where the flanges are sufficiently thick to force the two half sections together, otherwise the sections would be too loose and the buttons would fall off thereby completely breaking the seal of the package. The number of such specific points which may be provided is limited because of the need for thin portions of the flanges as well as thick portions in order to place the C-shaped buttons over the flanges, and because the slope of the change from a thin portion to a thick portion must be gradual enough that the buttons do not bind thereon. As a result of this limitation the restraining force is concentrated at such specific points which produces the aforementioned detrimental results described with respect to the Herrington patent. In addition, any tangential force applied to a button, as is likely to occur during handling of the package, will tend to move the button toward a thin portion of the flanges which will cause it to become loose and degrade the seal.

Therefore, it can be seen that there is a need for such a collapsible, reusable barrel utilizing a seal which permits the barrel to be rapidly assembled and disassembled yet distributes the restraining force evenly around the periphery thereof and which resists tangential forces that may occur during handling of such barrels. Also, in order to protect the contents of such barrels from theft and vandalism which frequently take place, particularly in international shipping, it is important to provide such barrels with a sealing assembly which may not be broken by hand.

SUMMARY OF THE INVENTION

The present invention is directed to a rigid barrel for storing and shipping a great variety of commercial and industrial goods such as fuels, lubricants and solvents wherein the barrel is comprised of two detachable half sections, each in the shape of a frustrum having its larger end open and its smaller end closed. In the assembled barrel, the open ends of the barrel halves are securely attached to one another at their peripheries to form a leak-proof seal around the middle girth of the barrel. One or both of the closed ends of the barrel halves ordinarily contain a suitable bung hole for filling and emptying the barrel. When the barrel is disassembled, the half sections may be nested one inside the other to conserve space.

A particularly secure and leak-proof seal is provided by a pair of flanges formed around the periphery of the open ends of the two barrel halves respectively, a resilient gasket placed between the flanges and clamp members which hold the flanges adjacent one another separated only by the gasket. The clamp members comprise either a pair of annular clamps placed over the respective barrel halves and bolted together, or a plurality of C-shaped clamps placed interlockingly over both flanges at arbitrary positions around the periphery thereof. Both types of clamps may be further secured by placing a metal band around their periphery seated in an outside bight portion thereof.

The use of C-shaped clamps which interlock with the barrel flanges is particularly advantageous in that they may be rapidly and easily attached merely by pressing the barrel halves together momentarily, placing the clamps over the flanges and thereafter releasing the barrel halves. Similarly, they may be detached by reversing the process. At the same time, since the clamps may be applied to the barrel all along the periphery of the sealing assembly without regard to location, a great many of them may be readily applied as needed for greater strength and they may be evenly distributed along the sealing assembly as needed to prevent leaks and concentrations of restraining force, thereby maintaining the integrity of the seal.

In addition, the resilient gasket and the dimensions of the sealing assembly can be made such that a powerful machine such as a hydraulic press or the like is required to force the two barrel halves together in order to remove the C-shaped clamps. This prevents accidental release of the clamps during handling and deters tampering with the barrel seals by thieves or vandals. The security of this sealing assembly becomes particularly advantageous where the barrel assembly is provided with lockable bung holes or outlets.

Therefore it is a principal objective of the present invention to provide a new and improved collapsible reusable barrel for shipping and storing commercial and industrial fluids and other materials utilizing a pair of barrel half sections which may be securely sealed together to prevent leakage or accidental disassembly.

It is another principal objective of the present invention to provide such a barrel in which the half sections are secured together by clamps which may distribute the securing force relatively evenly around the periphery of the barrels.

It is a further principal objective of the present invention to provide such a barrel wherein a tamper-resistant seal is provided for holding the half sections together.

The foregoing and other objectives, features, and advantages of the present invention will be more readily understood upon consideration of the following detailed description of the invention taken in conjunction of the accompanying drawings.

BRIEF DESCRIPTION OF THE DRAWINGS

FIG. 1 is a top perspective view of a collapsible reusable fluid barrel according to the present invention in its fully assembled condition with two barrel halves sealingly joined together in the middle of the barrel.

FIG. 2 is a top perspective view of the barrel in its disassembled condition, with one barrel half nested inside the other for transportation back to the original shipper.

FIG. 3 is a partial top view of the fully assembled barrel.

FIG. 4 is a partial broken cross-sectional view of the fully assembled barrel taken along the line 4—4 of FIG. 1.

FIG. 5 is a cross-sectional view of a leak-proof seam around the middle girth of the barrel illustrated prior to its being secured by a clamp.

FIG. 6 is a cross-sectional view of the aforementioned seam illustrated in its extreme compressed condition, under force from a machine-operated press for permitting the installation of the attaching clamps.

FIG. 7 is a cross-sectional view of the seam held together by an optional screw-type attaching clamp.

FIG. 8 is a cross-sectional view of an optional leak-proof joint for securing the circular cover plates to the closed ends of the respective barrel halves.

DETAILED DESCRIPTION OF THE INVENTION

In addition to the description found in the aforementioned application Ser. No. 255,597 for COLLAPSIBLE REUSABLE BARREL FOR FLUIDS, herein incorporated by reference, the following detailed description will aid in understanding the invention. With reference to FIGS. 3 and 5, since the outwardly projecting flanges 22 and 24 are formed uniformly around the periphery of the barrel halves, the C-shaped clamps 28 may be attached at arbitrary locations along the periphery by merely pressing the barrel halves together momentarily, placing the clamps over the flanges at such locations and thereafter releasing the barrel halves, leaving the clamps in the positions where they were initially placed. Thus, a plurality of clamps may be placed evenly around the periphery of the barrel as shown in FIG. 3 as needed to provide sufficient strength and distribute the restraining force uniformly. This feature prevents the restraining force from being concentrated at any one spot which would otherwise increase the likelihood of rupture of the seal and of leaks at spots where the force would be relatively less. Moreover, the sealing assembly is virtually unaffected by tangential forces applied to the clamps as might occur during handling of the barrels since the peripherally uniform flanges of the barrel halves with which the C-shaped clamps interlock permit the clamps to move along the periphery of the seal without becoming loose, and as long as such distances are not too great the restraining force will still be reasonably well-distributed. Of course, such peripheral movement will have no significant effect upon the distribution of force if a sufficient number of clamps are provided.

Turning to FIG. 6 the barrel halves are pressed together by a mechanical press having members 30 and 32 which force the flanges 22 and 24 together as shown. When the flanges are forced together sufficiently, the C-shaped clamps 28 may be placed over the flanges and the press released, permitting the gasket 26 to expand and force the flanges against the C-shaped clamps which interlock with the lips 34 and 36 formed in the flanges. The gasket 26 and the dimensions of the sealing assembly are such that the pressure required to force the two flanges together against the gasket sufficiently to permit removal of the C-shaped clamps is of such magnitude that it cannot be accomplished without the use of a powerful machine, such as a hydraulic press, having a mechanical advantage many times greater than that achievable by manual means. Therefore the clamps can neither be placed on or removed from the flanges without the aid of such a machine, which renders the barrel seal highly tamper-resistant.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a barrel for storing and shipping fluids and other materials comprised of a pair of frustrum-shaped shell-like barrel sections, each having a closed end and an open end larger than said closed end and being interchangeably nestable one within the other when disassembled, said barrel sections each having mating means for sealingly and detachably joining said open ends together with the respective interiors of said two barrel sections facing one another, the improvement wherein said mating means comprises: a pair of projecting flanges each extending peripherally around the respective open ends of said barrel sections, a resilient gasket for inserting between said flange pair, a plurality of unitary C-shaped clamp members spaced at arbitrary locations along the periphery of said flange pair for holding said flange pair in non-contacting close proximity with said gasket compressed therebetween, and means associated with said flange pair and said clamp members for interlockingly engaging said flange pair and clamp members at said arbitrary locations along the periphery of said flange pair while permitting said clamp members to be detached from said flange pair at said arbitrary peripheral locations by the pressing of said barrel sections together momentarily to increase the compression of said resilient gasket, thereby freeing said flange pair from engagement with said clamp members.

* * * * *

UNITED STATES PATENT AND TRADEMARK OFFICE
CERTIFICATE OF CORRECTION

PATENT NO. : 3,981,409
DATED : September 21, 1976
INVENTOR(S) : Robert D. Flanders It is certified that error appears in the above-identified patent and that said Letters Patent are hereby corrected as shown below:

Col. 1, Line 6   After "1972" insert a comma (,);

Line 16  Change "of" to --for--.

Signed and Sealed this

Third Day of May 1977

[SEAL]

Attest:

RUTH C. MASON
*Attesting Officer*

C. MARSHALL DANN
*Commissioner of Patents and Trademarks*